H. A. PEDRICK & G. F. KOLB.
METHOD OF MAKING PISTON RINGS.
APPLICATION FILED AUG. 23, 1916.

1,284,439.

Patented Nov. 12, 1918.

Inventors-
Howard A. Pedrick.
George F. Kolb.
by their Attorneys-
Howson & Howson

UNITED STATES PATENT OFFICE.

HOWARD A. PEDRICK, OF BALA, AND GEORGE F. KOLB, OF PHILADELPHIA, PENNSYLVANIA, ASSIGNORS, BY MESNE ASSIGNMENTS, TO WILKENING MANUFACTURING COMPANY, A CORPORATION OF PENNSYLVANIA.

METHOD OF MAKING PISTON-RINGS.

1,284,439.     Specification of Letters Patent.     Patented Nov. 12, 1918.

Application filed August 23, 1916. Serial No. 116,556.

*To all whom it may concern:*

Be it known that we, HOWARD A. PEDRICK and GEORGE F. KOLB, citizens of the United States, and residents, respectively, of Bala, Montgomery county, and the city and county of Philadelphia, State of Pennsylvania, have invented a Method of Making Piston-Rings, of which the following is a specification.

One object of our invention is to provide a method of making piston rings, particularly for internal combustion engines, which shall result in a product of such a nature that when placed in the cylinder of the engine for which it is designed, it will exert a uniform outward pressure at all points of its periphery.

In the accompanying drawing:—

As a result of considerable experiment we have found that a cast iron piston ring which throughout its periphery exerts a uniform pressure against the cylinder wall will, upon release from such cylinder, assume a shape determined by the laws of beams under load. Conversely, we have found that if a ring be formed with such a shape as that above indicated, it will, when placed in an engine cylinder, exert a pressure which is uniform at all points of its periphery. Also if a split circular ring is acted on throughout its periphery by uniform outward radial pressures, the shape which it will then assume is that which a ring must possess if it is to assume a circular form when acted upon by inward radial pressures.

If the opening in a split circular ring is expanded by the application of equal and opposite forces acting in a line tangent to said ring at the point at which the split is made, the compressive stress resulting from this deflection is equal in all parts of the ring and consequently the radial component of the force exerted by the internal stress in the ring will be uniform throughout its periphery. Moreover the shape assumed by the ring is that required to cause it to exert a uniform outward pressure at all points when compressed into the form of a circle.

Therefore, if a ring be expanded by forcing apart its split ends and be thereafter set in such expanded position, it will in effect be identical with such a ring as that above described as regards its ability to exert uniform pressure on the cylinder walls.

Figure 1:
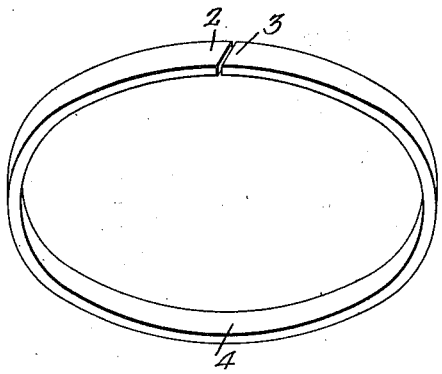
Figure 1 is a perspective view of a piston ring at one step of its manufacture.
Figure 2:
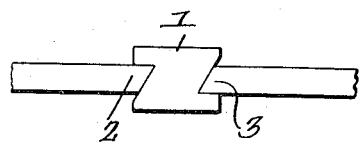
Fig. 2 is a plan of part of the ring showing the spacing piece in position.
Figure 3:
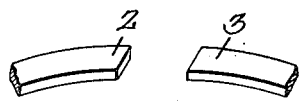
Fig. 3 is a fragmentary perspective, showing the separated ends of a ring after it has been given its final form before insertion in a cylinder.

In order to make a piston ring which shall have the above noted desirable characteristics, according to one method of procedure we insert a spacing piece 1 between the ends 2 and 3 of the ring 4, thereafter heating this to redness and then cooling it while it is thus expanded. In this case the natural resiliency of the metal of the ring furnishes the tangential force necessary and after such cooling if the ring be compressed from the shape in which its ends are separated, as in Fig. 3, and inserted in the cylinder of an engine, it is found to exert an outward pressure on the cylinder walls which is uniform at all points of its length.

Again, if the spacing piece be inserted between the ends of the ring as before so that the latter is compelled to assume the theoretically required shape, said ring may be used as a templet from which a die can be made. Thereafter rings heated to redness and forced to conform to such a die, will assume the shape of the original ring and as before will exert a uniform outward pressure upon the walls of a cylinder when mounted in the groove of a piston operative therein.

Without departing from our invention the ring may be heated to redness and then expanded by applying tangential forces to its ends, as by forcing a wedge between them or inserting between the ends the points of a suitable tool which may thereafter be operated to spread the ends to a desired distance.

We claim:—

1. The method of making a piston ring which consists in expanding a split circular ring by the application of uniform radial pressures thereto; and thereafter treating it to set the material of the ring to cause it to retain said expanded form.

2. The method of making a piston ring which consists in expanding a split circular ring by the application of uniform radial pressures thereto; and thereafter exposing the ring to the action of heat to set the material thereof in its expanded form.

3. The method of making a piston ring which consists in applying tangential expanding forces to the ends of a split ring; and treating said ring to set it in its expanded form.

4. The method of making a piston ring which consists in applying tangential expanding forces to the ends of a split ring; and setting the ring in its expanded form by the application of heat.

5. The method of making a piston ring which consists in applying equal and opposite forces to the ends of a split circular ring; and thereafter treating it to cause it to retain the shape thus assumed.

6. The method of making a piston ring which consists in applying equal and opposite forces to the ends of a split circular ring; and thereafter heating said ring to cause it to maintain its given form.

HOWARD A. PEDRICK.
GEORGE F. KOLB.